H. Y. ARMSTRONG.
WRAPPING MACHINE.
APPLICATION FILED NOV. 15, 1915.

1,298,637.

Patented Apr. 1, 1919.
6 SHEETS—SHEET 6.

Inventor:
Harry Y. Armstrong
By his attorney
Putnam Putnam & Bell

UNITED STATES PATENT OFFICE.

HARRY Y. ARMSTRONG, OF SPRINGFIELD, MASSACHUSETTS, ASSIGNOR TO PACKAGE MACHINERY COMPANY, OF SPRINGFIELD, MASSACHUSETTS, A CORPORATION OF MASSACHUSETTS.

WRAPPING-MACHINE.

1,298,637.    Specification of Letters Patent.    Patented Apr. 1, 1919.

Application filed November 15, 1915. Serial No. 61,557.

*To all whom it may concern:*

Be it known that I, HARRY Y. ARMSTRONG, a citizen of the United States, residing at Springfield, in the county of Hampden and State of Massachusetts, have invented certain Improvements in Wrapping-Machines, of which the following description, in connection with the accompanying drawings, is a specification, like reference characters on the drawings indicating like parts in the several figures.

This invention relates to wrapping and labeling machines and will be herein disclosed as embodied in a machine designed specifically to wrap a tobacco package of a very common form and apply a revenue stamp or label to the wrapped package. This package has a flat rectangular shape and the four longitudinal walls of the package project beyond its end faces so that these faces are set in slightly inside the extreme ends of the package. The invention provides a machine having a novel organization and is directed particularly to securing reliability and speed. The invention includes a novel folding mechanism, novel means for applying adhesive to the wrapper, a novel means for affixing the label or stamp to the package and other features which will be particularly pointed out in the appended claims.

In the accompanying drawings,

Fig. 2ª is a cross sectional view showing a detail of construction;

Fig. 9 is a cross sectional view on line 9—9, Fig. 1;

Fig. 9ª is a perspective view of a detail of construction;

Fig. 10 is a perspective view of the roll that applies adhesive material to the label;

Figure 13:
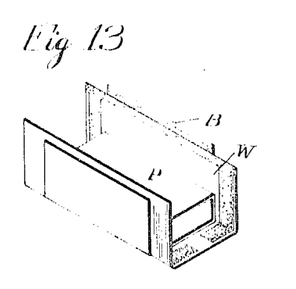
Figs. 13 to 20, inclusive, are perspective views showing successive steps in the wrapping and labeling operations.
Figure 19:
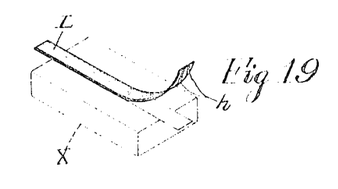
Figure 20:
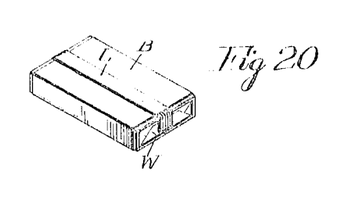

The specific machine shown is designed to wrap packages of tobacco of the general shape indicated at P, Fig. 13, in an outside wrapper W and also if desired in a wide band or label B, folding the wrapper and band about the package in the manner indicated in Figs. 13 to 18 and then applying to the package so formed a stamp or label L as indicated in Figs. 19 and 20. This label usually, in the case of tobacco packages is a revenue stamp, though obviously any other label might be applied in the same manner. The packages P as they come to the machine usually consist of a body of tobacco held in a rectangular tube made of stiff paper and completely inclosed in a tinfoil wrapper. The end folds of the tinfoil are set in slightly into the ends of the tube, so that the ends of the package have an inset or indented appearance as indicated in Fig. 13.

Figure 1:
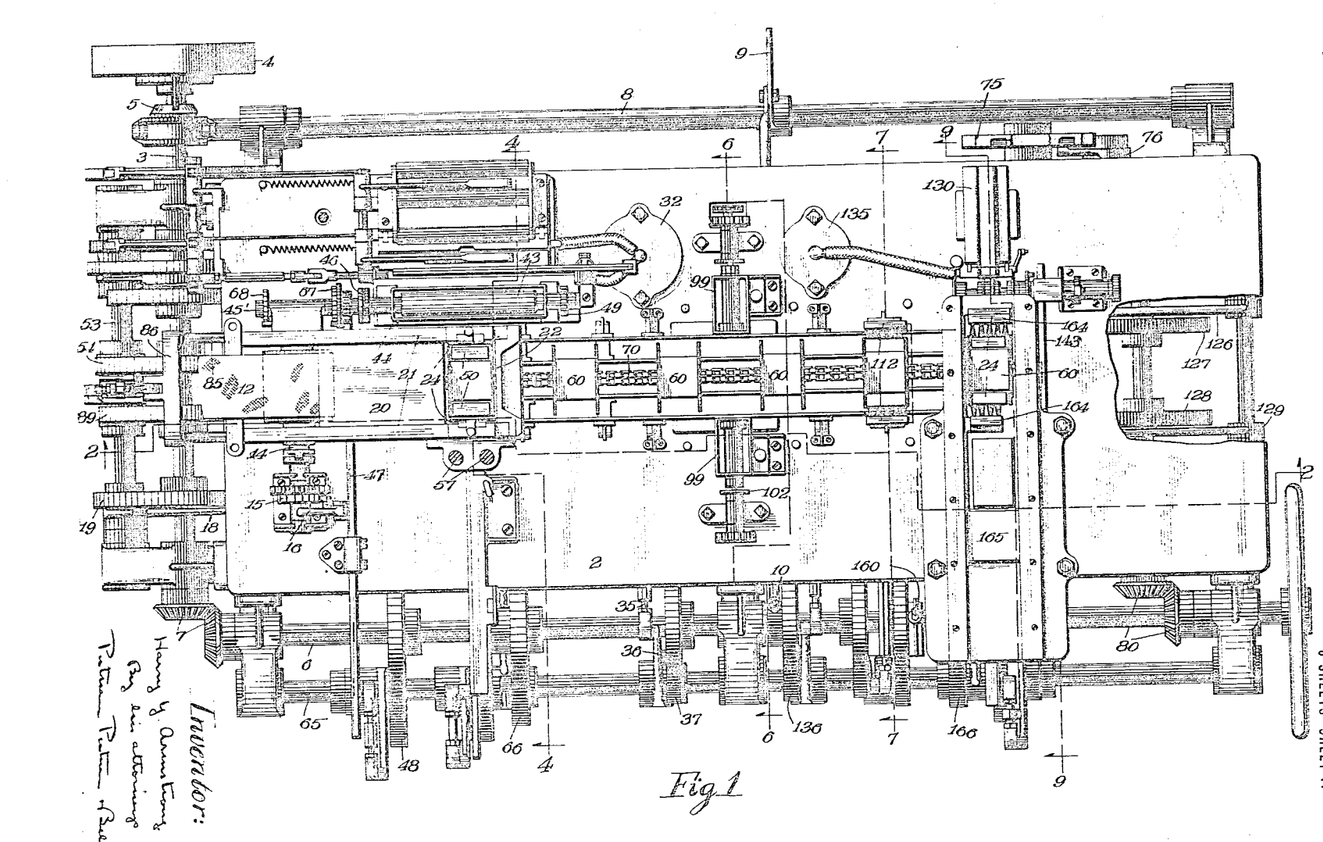
Figure 1 is a plan view of a machine embodying this invention, certain parts of the super-structure of the machine being omitted.
Figures 2, 3:
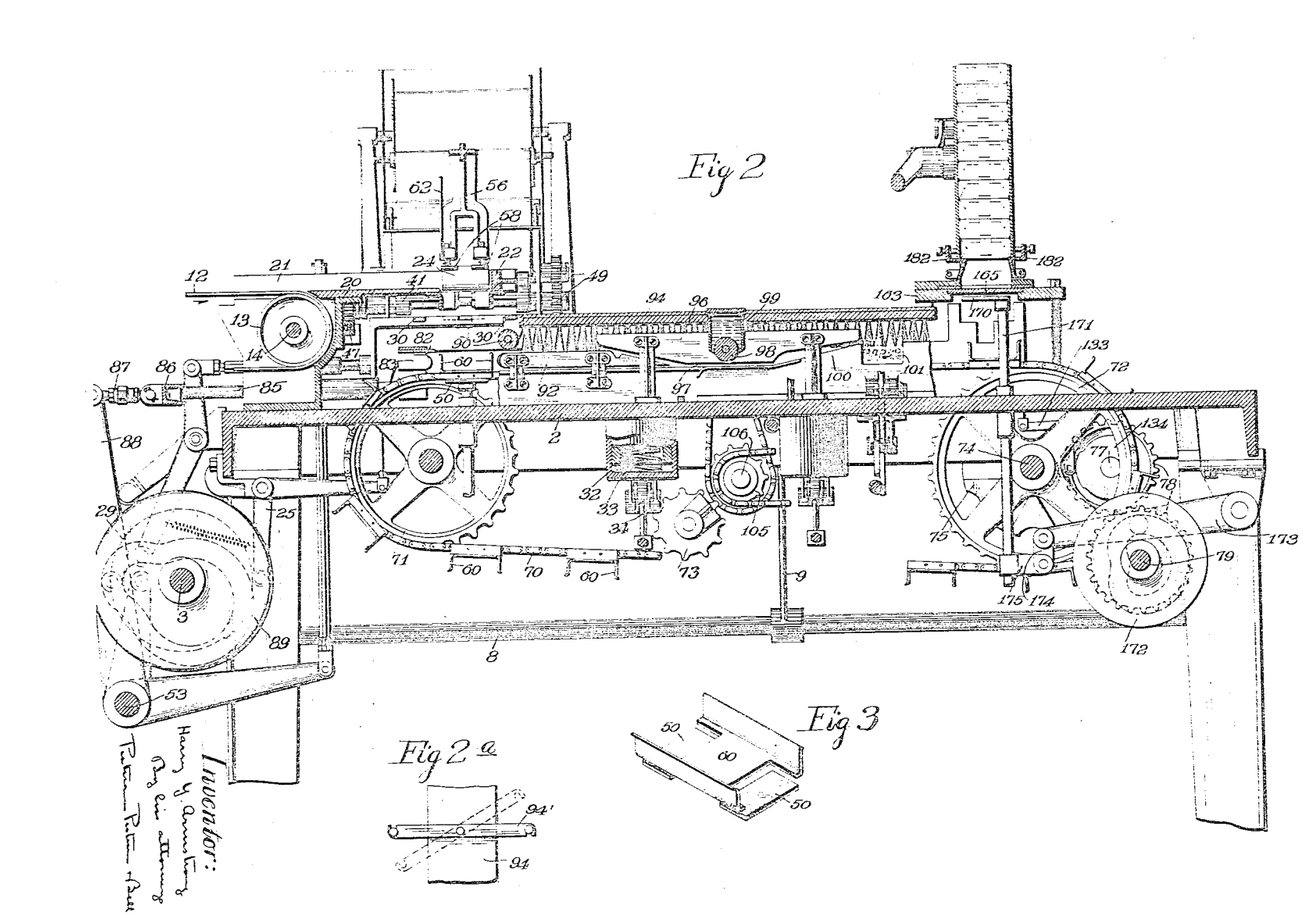
Fig. 2 is a vertical sectional view on the line 2—2, Fig. 1.
Fig. 3 is a persepctive view showing a detail of construction.

Referring now more particularly to Figs. 1 and 2, the reference numeral 2 indicates the main frame of the machine and 3 the main driving shaft of the machine which carries a loose pulley 4 that may be thrown into or out of driving engagement with the shaft 3 by means of a clutch 5. A cross shaft 6, extending longitudinally of and at one side of the machine frame, is driven through a bevel gear connection 7 with the main shaft 3. A rock shaft 8 at the opposite side of the machine frame has a connection with the clutch 5 by which it controls the clutch and this shaft is provided with a hand lever 9 to which is also connected another hand lever 10 on the opposite side of the machine frame, these levers enabling an operator to rock the shaft 8 and move the clutch 5 to start or stop the machine.

The packages are carried into the machine by means of a conveyer belt 12, supported on a pair of pulleys one of which is indicated at 13, Fig. 2. This pulley is mounted fast on a shaft 14 which is given a step by step rotative movement by means of a ratchet wheel 15 mounted on a shaft 14 (see Fig. 1). This shaft is connected by a simple form of clutch to another shaft carrying a ratchet wheel which is arranged to be engaged by a pawl carried by an oscillating lever 16 that is connected by a link 17 with one arm of a bell crank lever 18 which carries a roll running in the path of a cam 19 mounted fast on the main shaft 3. This driving mechanism serves to give the belt a step by step forward movement, thus causing it to deliver the packages onto a platform 20, lying in front of and in the same plane as the surface of the belt, the packages being guided in their movement along the platform by side pieces 21 that prevent any lateral displacement of them. The packages are advanced in this manner until the foremost package is moved off the front end of the platform 20 and between two vertical spring pressed plates 24 (see Fig. 4) having inturned lips or flanges at their lower edges that support the opposite ends of the package, at which time it strikes a stationary stop 22 which arrests the movement of the entire line of packages. This foremost package is now positioned for the initial wrapping operation.

While a package is being positioned in the manner above described, the wrapper in which the package will be inclosed, is advanced into position to meet the package. In the present instance, the package is to be inclosed in a wrapper W which may consist for instance of a waxed or glassine paper, and a band B of such width as to cover substantially all of the four longitudinal faces of the package. Inasmuch as the wrapper is plain whereas the band usually bears advertising matter, it generally is preferable to feed the wrappers from a roll 26 and to have the bands cut to the proper size and fed from a magazine 27 (see Fig. 4). Any suitable form of wrapper and band feeding mechanism may be employed. In the machine shown in the drawings, I have shown in a general way a wrapper feeding and cutting mechanism substantially identical with that shown in the Smith application Serial 51268 filed Sept. 17th, 1915. Inasmuch as this mechanism is disclosed in said application as applied to the machine shown in the accompanying drawings, it seems unnecessary to described it other than to state that it comprises a nipper 28 which is operated by a cam on the main shaft 3, this nipper being operative to advance wrappers supplied from the roll 26, one at a time, on to a platform 30, immediately under the point at which the foremost package is supported by the members 24. The wrappers are advanced and cut off in the manner fully described in the Smith application above designated.

At the same time that the nipper 28 advances the wrapper W in position for the wrapping operation, it also advances one of the bands B which it has taken from the top of the stack in the magazine 27. The forward edge of the uppermost band in the stack is raised in position to be gripped by the nipper by means of a rocking suction plate 31, the suction being created by a pump 32 (see Figs. 1 and 2). This mechanism is substantially like that shown in the Berger Patent No. 643,621 granted Feb. 20, 1900, and therefore, need not here be described in detail. The suction stroke of the pump 32 is produced by spring 33 (see Fig. 2) and the release stroke is produced by a bell crank lever 34, one end of which raises the movable element of the pump, while the other end is connected by means of a rod or link 35 (see Fig. 1) to a lever 36 that is oscilllated by means of a cam 37 on the cross shaft 6. The suction plate 31 is oscillated by means of a rod or link 17 (see Fig. 4) that connects one end of this plate with a bell crank lever 25 that is oscillated by a cam 29 on the shaft 3. The stack of bands in the magazine 27 is held against a stop plate at the top of the magazine by means of a plunger on which the stack is supported and which is carried by rod 39 (see Fig. 4) mounted to slide in suitable guides and held in an elevated position by spring 40 that encircles the rod and acts on a collar secured thereto.

Figure 12:
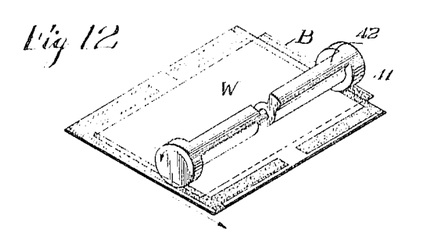
Fig. 12 is a perspective view showing the operation of applying adhesive material to the wrapper in which a package is to be inclosed.

While the wrapper is being advanced by the nipper 28 it is moved under and in contact with a glue applying roll 41 that serves to apply glue or other adhesive material to the margins of the wrapper. In the present machine, it is desired to have the glue applied to all four margins of the wrapper but to avoid applying glue to the nipper. Accordingly, the roll 41, as best shown in Fig. 12, is provided with two cylindrical end portions designed to travel on and apply glue to the margins of the wrapper that extend parallel to its direction of movement and it also has a longitudinal rib 42 that applies glue to the front and rear margins of the wrapper. The central portion of this rib 42 is cut away at a point where otherwise it would strike the nipper 28 so that no adhesive material is applied by the roll either to the nipper, the part of the wrapper that is gripped by the nipper, or to the corresponding portion of the wrapper immediately opposite that gripped by the nipper. One edge of the band B also has glue applied thereto at this time. The shaded part of the wrapper W and band B as shown in Fig. 12 indicate the portions to which adhesive material is applied by the roll 41. The roll 41 receives its supply of glue from another roll 43 with which it runs in contact, the latter roll running in a tank 44, suitable scraping devices of the character commonly employed in this art being provided to maintain the proper film of glue on the roll 43.

Preferably the roll 41 is driven at substantially the surface speed at which the wrapper is advanced by the nipper 28. For this purpose, the roll 41 is mounted on a shaft 45 and an extension 45' of this shaft to which it is connected by a simple form of clutch 46, Fig. 1, carries a loose pinion that runs in mesh with a rack 47 that lies parallel to the slide or bar on which the nipper 28 is mounted and is operated by connections with a cam 48 that move this rack in unison with the nipper 28. The glue applying surfaces of the roll lie substantially on the pitch circle of the pinion operated by the rack 47, so that these surfaces have the same peripheral speed that the wrapper has. The pinion operated by the rack 47 drives the shaft 45' through a ratchet 67 which is engaged by a pawl that enables the pinion to drive the shaft in one direction only. Another pawl and ratchet mechanism 68 on the shaft 45' prevent any reverse rotation of the roll 41. A pair of gears indicated at 49 in Fig. 2 connect the shaft 45 with the roll 43 and drive the roll.

The wrapper W and band B have been positioned immediately under the package supported by the two members 24 and rest on the bars 30 (see Fig. 2) that form part of the wrapper supporting platform. In the meantime a U-shaped plunger 50 has moved from the position in which it is shown in full lines in Fig. 2, to that in which it is shown in dotted lines in said figure, in which position it lies substantially flush with the upper surfaces of the bars 30 and consequently helps to support the wrapper in the position in which it has just been delivered. The operating mechanism for this U-shaped plunger comprises a link 51, Figs. 4 and 1, that connects the lower horizontal part of this plunger to the forward end of a bell crank lever 52 which is fulcrumed on a lever shaft 53 extending parallel to the shaft 3, and carries a roll running in the path of cam 54 on the shaft 3.

While the plunger 50 is moving upwardly into engagement with the wrapper, a presser head 56 that is mounted on a pair of rods 57 supported for vertical movement in the main frame and which carries a pair of spring pressed plates 58, is moved downwardly, thus causing the plates 58 to yieldingly force the package now supported between members 24 downwardly through a short guideway 59 into contact with the wrapper. At substantially this instant the nipper 28 releases the wrapper and band which it has just advanced but not until the plates 58 have pressed the package firmly against the wrapper and the plunger 50 thus preventing any displacement of either the wrapper or the package. Both the presser head 56 and the plunger 50 now move downwardly in unison carrying the package and its wrapper into a pocket 60 which is waiting to receive it. The presser head 56 carries a vertical plate 62 which serves, while the head is moving downwardly, to block off the other packages on the platform 20 and prevent any further advancing movement of them until the presser head has been raised again.

Figure 4:
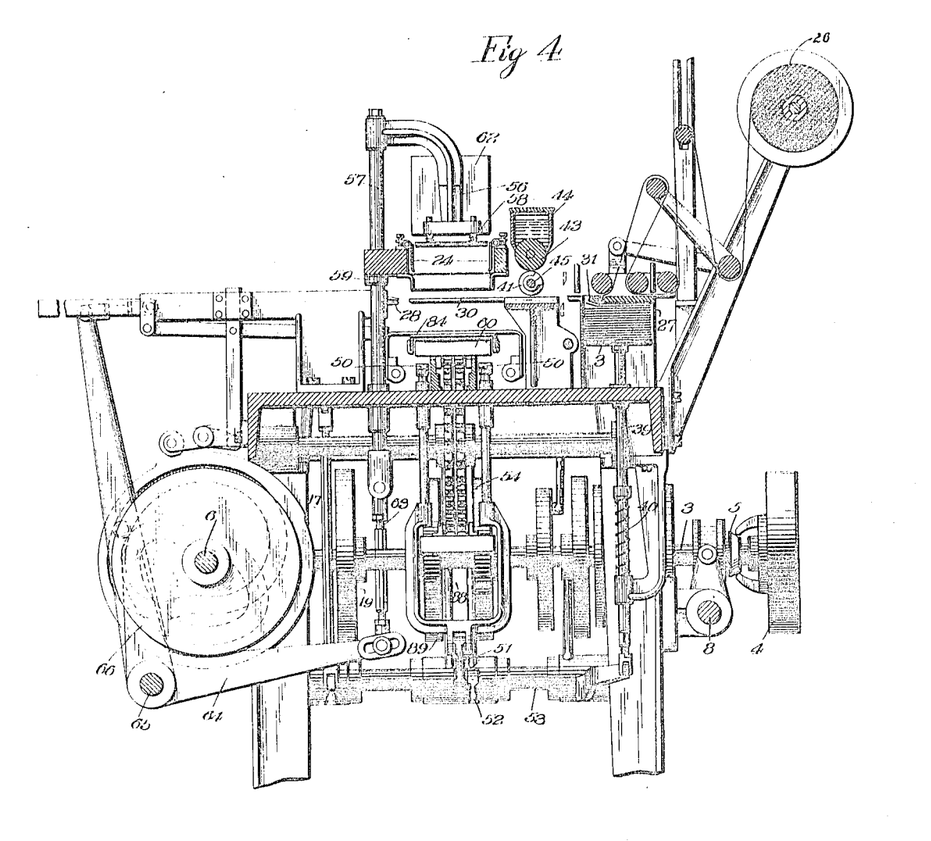
Fig. 4 is a vertical sectional view on the line 4—4, Fig. 1.

The operating mechanism for this presser head is best shown in Fig. 4 from which it will be seen that this mechanism comprises a link 63 that connects the lower ends of the rods 57 with one end of a bell crank lever 64 which is fulcrumed on a lever shaft 65 lying parallel to the shaft 6 and carries a roll that runs in the path of cam 66 fast on the shaft 6. As soon as the head 56 has descended far enough to force the package and its wrapper firmly into the pocket 60, this head is raised again to the upper limit of its stroke in order to allow the next succeeding package to be advanced under it and against the stop 22. The plunger 50 also retires to the position in which it appears in full lines in Fig. 2.

The pocket 60 is one of a series of pockets all alike which are carried by a chain 70 that is supported on a pair of sprocket wheels 71 and 72. An idler wheel 73 bears against the lower reach of this chain and serves to keep it tight. These pockets 60 carry the package to the various devices that operate on the wrapper and band to fold them about the package. For this purpose, the chain 70 is given a step by step advancing movement which is imparted to the chain through the sprocket wheel 72. This wheel is mounted on a shaft 74 on which is also affixed a Geneva wheel 75. The driver 76 for this Geneva wheel is mounted on a shaft 77 which is driven by means of gears 78 from a shaft 79, having a driving connection through beveled gears 80 with the shaft 6. This mechanism of course gives the chain and the series of pockets carried thereby an intermittent advancing movement such that one of the pockets 60 is always brought into register with the plunger 50 at the proper time to receive each package as it is delivered by the plunger 50 and head 56.

It should be noted that the bottom of each of the pockets 60 is cut away at its opposite sides, as best shown in Fig. 3, so that the bottom of the pocket is considerably narrower than the length of the package which it is designed to receive; and that the plunger 50 is shaped to straddle the bottom of each pocket as the pockets are brought one after another into register with it. This arrangement is best shown in Figs. 1, 3 and 4, and it produces the advantage of enabling the plunger 50 to support the package near its opposite ends where it is stronger and firmer than at the middle. Consequently, it enables the plunger 50 and the presser plates 58 that coöperate therewith, to handle the package with more certainty and with less danger of distorting it than otherwise would be possible.

Figure 5:
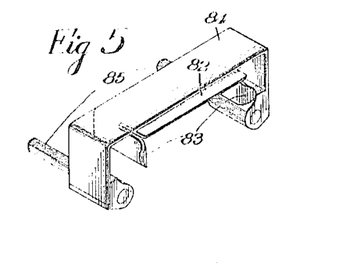
Fig. 5 is a perspective view showing one of the folders.
Figure 14:
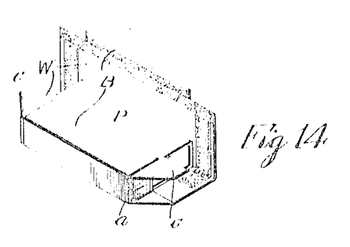

The act of forcing the package into one of the pockets 60 in the manner above described results in folding the wrapper W and band B about the bottom and the two opposite sides of the package leaving it in the condition shown in Fig. 13. Immediately after a package with a wrapper partially folded about it in this manner has been deposited in the pocket 60, a top folder 82 (see Figs. 2 and 5) advances and folds the upstanding portions of the band and wrapper at the rear of the pocket down on to the top of the package, as shown in Fig. 14. At the same time two end tuckers 83 (see Fig. 5) which are formed at opposite ends of the folder 82 advance and tuck in the extensions of the wrapper at the opposite ends of the package, as indicated at $a$ in Fig. 14. This folder with the two tuckers 83 is supported on a bridge piece 84 that is mounted on two horizontal rods 85 which are supported in suitable guides and carry at their rear ends a cross piece 86 (see Figs. 1 and 2) which is connected by means of a link 87 with the upper end of a lever 88 which is fulcrumed on the shaft 53 and is oscillated by a cam 89 fast on the main shaft 3. This folder 82 completes its forward movement making the first end tucks $a$ in the wrapper before the package begins to move forward. The upper end flaps $c$ that are left projecting at the opposite ends of the package slide into the V-shaped notches between the ends of the part 82 and the tuckers 83 and are creased near the ends of the package by the action of these peculiarly shaped parts.

Figure 15:
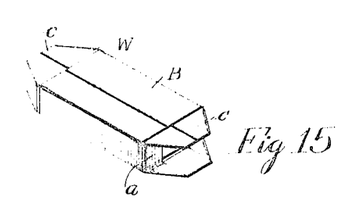
Figure 16:
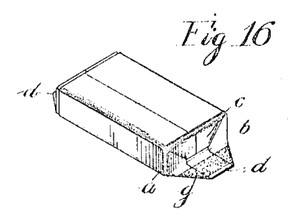

The chain 70 is now moved forward one step by its operating mechanism above described, thus bringing another pocket into position to receive the next package and moving the package last deposited on the chain into a folding chute. During this movement the flap of the wrapper and band which are standing up at the forward end of the pocket are carried under a roller 90 which folds this flap over into the position in which it is shown in Fig. 15. At about the same time the package passes into engagement with a pair of end tuckers which form opposite sides of the receiving end of the chute and serve to make the second pair of end tucks $b$ corresponding to that indicated at $a$. The package is now in the condition in which it is shown in Fig. 15. As the package is moved forward through the folding chute, a brush 94, which forms the top of the chute, holds the last upper fold in place while the glue on the wrapper flap 70 sets. This brush is removably supported on posts, as indicated in Fig. $2^a$, so that it can readily be taken up to afford access to the packages in the folding chute in case they stick. The package next comes into engagement with a pair of top end folders 96 having downwardly inclined folding surfaces that fold the upper end flaps $c$ from the position in which they are shown in Fig. 15 down against the ends of the package as indicated in Fig. 16.

The entire folding operation has now been completed except that necessary to fold the two lower end flaps $d$ against the ends of the package. These flaps are now projecting through the slots 97 under the horizontal edge of the folds 96 and as they are carried along these slots by the chain 70, they are brought under a pair of glue applying rolls 98 which are supplied with glue from tanks 99 and which operate to apply a strip of glue to each of the end flaps $d$ as indicated at $g$ in Fig. 16. These rolls not only glue the parts of the flaps that have been folded over in previous wrapping operations but also apply glue to those portions of the margin of the wrapper to which adhesive was not applied by the roll 41 because of the presence of the notch or gap in the rib 42 of said roll 41.

Figure 17:
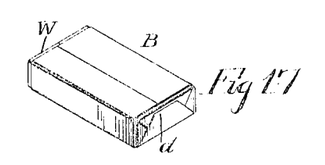
Figure 18:
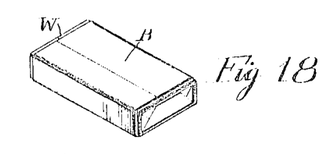

As the package further advances the end flaps $d$ are turned up against the ends of the package into their folded positions, as shown in Fig. 17, by the forward inclined edges of stationary folders 100 (see Fig. 2). The package is then brought to rest with its ends in register with two apertures 101 formed in the opposite walls of the folding chute.

Figure 6:
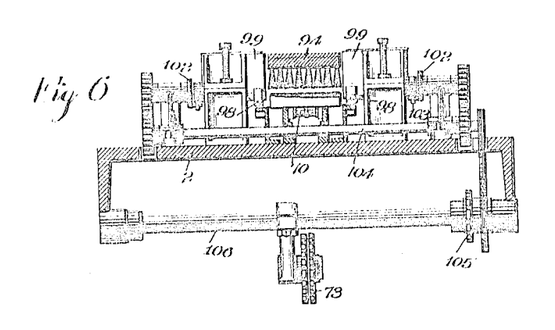
Figs. 6 and 7 are cross sectional views on the lines 6—6 and 7—7, respectively, Fig. 1.

The glue applying rolls 98 may be driven in any convenient manner. As shown in Fig. 6 they are operated respectively by two shafts each carrying a disk 102 from which projects a horizontal pin engaging with a radial pin 103 that extends from the shaft on which the roll 98 is mounted. The shafts carrying the disks 102 have geared connections with another shaft 104 driven by a sprocket and chain connection with a sleeve 105 rotating on the shaft 106. This sleeve carries a sprocket wheel that is driven by a chain connection with another sprocket wheel on the shaft 74.

Figures 7, 8:
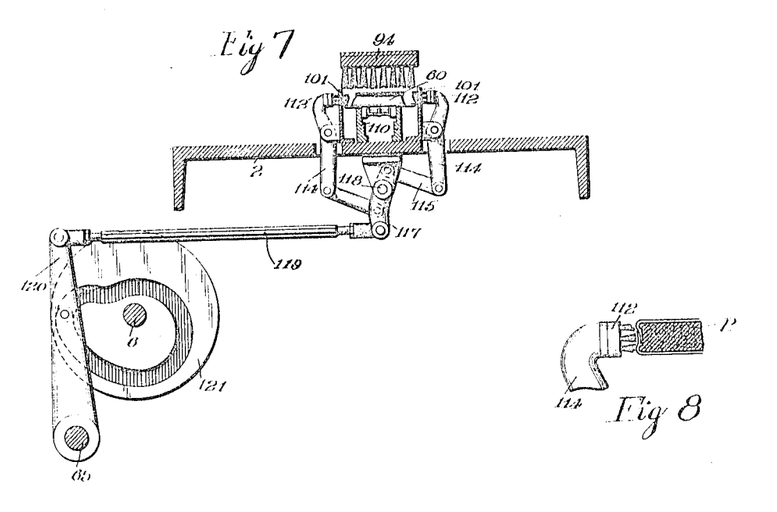
Fig. 8 is a fragmentary cross sectional view showing one of the wrapping operations.

While the pockets 60 are traveling through the folding chute they slide on a pair of horizontal guides 110 which keep them in alinement with the folders. When one of the packages arrives at the end of the folding chute and opposite the apertures 101, a pair of presser devices 112 move inwardly through the apertures 101 and into engagement with the opposite end faces of the package. These devices in the form shown, each consists of a small brush mounted on the upper end of one of a pair of levers 114 (see Fig. 7) that extends through the top of the machine frame. The lower ends of these two levers 114 are connected by links 115 and 116 to a lever 117 at points lying on opposite sides of the fulcrumed point 118 of said lever. This lever 117 is connected by link 119 to the upper end of a lever 120 which carries a roll that runs in the path of a cam 121 that rotates with the shaft 6. This cam operates through the chain of connections just described to move the presser devices 112 toward and from each other and is so timed that it moves the presser devices into contact with the end faces of a package as soon as the package arrives opposite the apertures 101 and holds them there until just before the package is given its next advancing movement. These devices operate to press the end folds of the wrapper in against the inset or indented end faces of the package, changing the appearance of the end of the package from that indicated in Fig. 17 to substantially that indicated in Fig. 18. This completes the wrapping operations and the package is next moved into position for the application thereto of a label.

While the package is still in the pocket 60, it is moved into register with a plunger 124 somewhat like the plunger 50 and arranged to straddle the bottom of pocket 60 in exactly the way that the plunger 50 does. This plunger 124 is given an up and down movement through the pockets 60 as they are brought successively into register with it by means of a cam on the shaft 79.

Figures 9, 9A, 10:
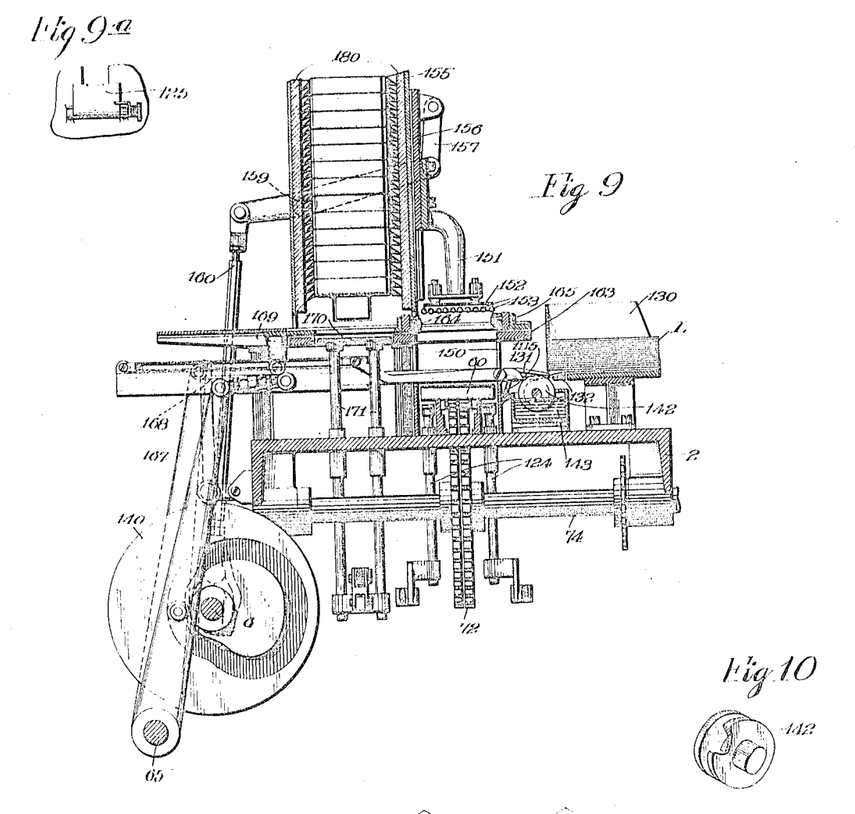

Immediately after a package is positioned over the plunger 124, a label L (see Figs. 9 and 19) is positioned over or in front of the package. These labels, in the arrangement shown, are stacked in a magazine 130 and at each cycle of operation of the machine the bottom-most label is fed out of the magazine by means of a reciprocating nipper 131. This label feeding mechanism is identical with that shown in the Berger patent above designated so far as all substantial particulars are concerned. The forward end of the bottommost label is deflected by means of a suction plate 132 that is operative by connections including a lever 133 (see Fig. 2) with a cam 134 on the shaft 77, the suction being provided by a pump 135 like the pump 32 and operated by cam 136 in the same manner that the cam 37 operates the pump 32. The nipper 131 is formed on the end of a long nipper bar that is mounted to slide in a horizontal guideway and is operated by connections best shown in Fig. 9 with a cam 140, while the movable jaw of the nipper is controlled by connections operated by a face cam, formed on the periphery of the cam 140. This construction is like that shown in the Berger patent above mentioned and therefore need not be described in detail. These connections cause the nipper 131 to advance to the front of the magazine 130 as shown in Fig. 9 and grasp the forward end of the lowermost label L which has been deflected into a position for the convenient grasp of the nipper by means of the suction plate 132. The cam 140 then causes the nipper to withdraw and pull the lowermost label out of the magazine 130 and position it over the package last presented to the labeling mechanism. Fig. 19 shows the label as it is positioned over the wrapped package X but shows one end of the label curled up merely for the purpose of showing the way in which the glue is applied to it. This label of course lies over the package in a horizontal position.

While the nipper is advancing a label in this manner, it draws it over the periphery of a glue applying roll 142, the construction of which is best shown in Fig. 10. This roll rotates in a reservoir 142 of adhesive material, suitable scrapers being provided to control the thickness of the film of glue on its peripheral surface. As shown in Fig. 10 the roll 142 is split or consists of two disk shaped glue applying parts that are spaced from each other by a distance sufficient to permit the entrance of the nipper 131 between them as shown in Fig. 9. Consequently as the nipper advances the label, the roll 142 applies two strips of glue as indicated by the shaded surfaces $h$ in Fig. 19 to the entire length of the label. This roll 142 is rotated in the same manner that the glue applying roll 41 is driven. The rack 143 is operated in unison with the nipper 131 by means of a cam on the shaft 6 to drive the glue roll 142 at substantially the same peripheral speed that the label has during its advancing movement. The nipper 131 draws the label L through apertures formed in two plates 150 mounted at opposite sides of the position occupied by a package at this time and these apertures serve to position the label against lateral displacement. A small pivoted plate 125 positioned between the front plate 150 and the roll 142 has a notch as shown in Fig. 9ª to aid also in positioning the label. This plate yields away from the plate 150 when struck by the nipper as shown in Fig. 9 but is returned to its upright position by a spring as soon as the nipper withdraws.

While the nipper is positioning the label in the manner just described a presser head or plunger 151 similar to the head 56 is descending into engagement with the package. This head carries a spring pressed plate 152 that supports a series of small rolls 153 which form the package engaging face of the presser head. This head or plunger is mounted for vertical movement and for the purpose of giving this member its operative movement it is bolted to a shoe 156, that is mounted in a guideway formed in one wall of a stationary magazine or stacker 155, and said shoe is connected by a link 157 to one end of lever which is fulcrumed at 159 (see Fig. 9), the other end of this lever being connected to the upper end of a cam follower 160 which is operated by cam that rotates with the shaft 6 (see Fig. 1). This mechanism and the operating mechanism for the plunger 124 are so timed that the rolls 153 are brought into contact with the label as soon as it is positioned properly on the package by the nipper 131, and these rolls press the label against the package holding it securely in place while the nipper releases it. The plunger 124 comes up through the pocket 60 and while supporting the package by its opposite ends, raises the package, the plunger moving upwardly in unison with the plunger 151.

These two plungers 124 and 151 carry the package with the label positioned thereon upwardly through an aperture formed in a plate 163 and into engagement with a pair of brushes 164 that fold the ends of the label against opposite end faces of the package as indicated in Fig. 20. These brushes are set rather closer together than the distance between the ends of the package so that they will press the ends of the label firmly against the inset end faces of the package. These brushes thus serve also to press the folds at the inset ends of the package firmly against the opposite end faces of the package. A slide 165 supports these two brushes and is mounted to reciprocate in horizontal ways formed in a plate 163, from the position in which it is shown in Fig. 9, where the brushes receive the package to a position at the left of that shown in said figure, where the brushes deliver the package to a stacker mechanism. This reciprocating movement of the slide 165 is produced by cam 166 (see Fig. 1) which oscillates a lever 167 that is fulcrumed on the lever shaft 65 and has its upper end connected by a link 168, Fig. 9, with a lug 169 that depends from the lower side of the slide 165.

As soon as the two plungers 151 and 124 have delivered a package to the brushes 164, the lower plunger 124 retires in readiness to receive the next package, and the slide 165 is then moved to transfer to the stacker the package which is now held by the brushes 164. This transferring movement takes place at right angles to the direction in which the package was moved into engagement with the brushes and it serves the double purpose of moving the packages out of the path of movement of the plungers 124 and 151 and of holding the ends of the stamp or label against the inset end faces of the package while the glue partly sets.

The stacker mechanism comprises a plunger plate 170 of substantially the area of the bottom of the package, mounted on a pair of rods 171 guided for vertical movement in the machine frame. This plunger is operated by a cam 172 (see Fig. 2) which is arranged to oscillate a lever 173 that is connected to the rods 171 by means of a link 174 and a bracket 175; and it operates as soon as the package is delivered to it by the slide 165 to move upwardly between the brushes 164 and push the package which they hold up into a vertical chute. This chute has two brushes 180 lining its opposite walls which bear against the opposite end faces of the package and hold the ends of the labels in their folded positions until the glue by which they are secured has set. The bristles of these brushes are upwardly inclined in the direction in which the packages are forced between them by the plunger 170 so as to facilitate the entrance of the packages between them and also to enable the brushes to support the entire stack of packages against downward movement under the influence of gravity. If, for any reason, it should be found undesirable to use brushes stiff enough to sustain the packages in this manner, a pair of spring latches 182 (see Fig. 2) could be employed for this purpose.

Figure 11:
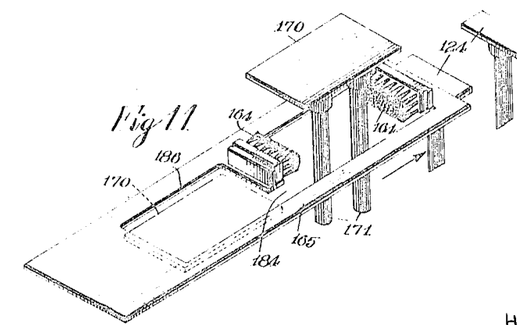
Fig. 11 is a perspective view showing certain details of the labeling mechanism.

In order to give the slide 165 more time in which to make its reciprocating movement, this slide or plate is cut away at one side of the lefthand brush 164 as the parts are shown in Fig. 11, leaving a gap 184 for the passage of the rods 171 that support the plunger 170. This construction enables the plate 165 to move forward to position the brushes 164 properly to receive the next package while the plunger 170 is in its elevated position, and the plunger 170 then descends through an aperture 186, as indicated in dotted lines in Fig. 11 while the plate 165, is at the forward limit of its stroke. The plate then slides back over the plunger 170 delivering to it the next package that is to be forced upwardly between the brushes 180.

The operation of the machine has been so completely described above in connection with the description of the machine structure that any further description of operation is believed to be unnecessary. Some features of the labeling mechanism, particularly the nipper mechanism, have been purposely omitted from Fig. 2, in order to render this figure less confusing.

It should be noted that, due to the peculiar way in which adhesive material is applied to the wrapper and band, these parts not only are secured to each other but the wrapper also is adhesively secured to the package.

The successive sets of brushes that are arranged to bear on the folds at the opposite ends of the package press these folds firmly into the insets at the ends of the package and thus not only preserve the peculiar and distinctive appearance of the package, but also produce a tight and effective sealing of the overlapping parts at the ends of the package. This is an important feature in wrapping the peculiar construction of package shown at P in the drawings.

While the invention has been described as embodied in a machine designed to wrap a package of a peculiar form, it is obvious that the invention is not limited in use to this particular kind of a package but that many features of the wrapping and labeling mechanism may also be used in wrapping or labeling packages of various kinds.

Having thus described my invention, what I claim as new and desire to secure by Letters Patent of the United States is:

1. In a wrapping machine, the combination with folding mechanism and a reciprocating nipper operative to advance wrappers one at a time to said mechanism, of means for applying adhesive material to said wrapper adjacent to the point at which it is gripped by said nipper, said applying means being constructed and arranged to avoid applying adhesive material to said nipper, and means operative after said nipper has released the wrapper to apply adhesive material to the portion of the wrapper previously grasped by the nipper.

2. In a wrapping machine, the combination with folding mechanism and a reciprocating nipper operative to advance wrappers one at a time to said mechanism, of means for applying adhesive material to all the margins of each wrapper while it is being advanced by said nipper, said means being constructed and arranged to avoid the application of adhesive material to the nipper, and means operative to apply adhesive material to the portion of the wrapper grasped by said nipper after the wrapper has been partially folded about an article by said folding mechanism.

3. In a wrapping machine, the combination with folding mechanism operative to fold a wrapper about an article and including a folding chute operative to fold the end flaps of the wrapper against opposite ends of the article, of a pair of presser devices mounted near the end of said chute for movement toward and from each other into and out of engagement with the opposite ends of a package, said presser devices each having a brush constituting its package engaging face and operative to force the central portion of the end folds of the package which it engages inwardly beyond the outer edges of the ends of the package, operating mechanism for moving said presser devices toward and from each other, and package advancing means operative to position packages one at a time for the operation thereon of said presser devices.

4. In a wrapping machine, the combination of a chain carrying a series of pockets each constructed and arranged to receive an article with a wrapper partially folded about it, supporting and operating mechanism for said chain operative to give the chain a step by step advancing movement, a receiving plunger mounted for reciprocating movement in a fixed path through each of said pockets as they are brought successively into register with it, an article support positioned above said plunger, means for advancing articles to be wrapped one at a time onto said support, means for advancing wrappers one at a time in position below said support to be engaged by one of said articles, a plunger operative to force the articles so positioned one at a time downwardly into engagement with their respective wrappers and on to said receiving plunger while the latter plunger is in its elevated position, and folding devices operative to fold each wrapper about the sides and ends of an article positioned in one of said pockets while it is advanced by said chain, said folding means including a folding chute having a plurality of stationary folding devices.

5. In a wrapping machine, the combination of a chain having a plurality of pockets each constructed and arranged to receive an article with a wrapper partially folded about it, supporting and operating mechanism for said chain arranged to give the chain a step by step advancing movement, means for delivering packages one at a time with a wrapper partially folded about each package into the pockets of the chain, devices arranged to fold the wrappers about the packages while they are in said pockets, an ejector operative to push the packages one at a time out of said pockets, and a label affixing mechanism to which the packages are delivered by said ejector.

6. In a wrapping machine, the combination of a chain having a plurality of pockets each constructed and arranged to receive an article with a wrapper partially folded about it, supporting and operating mechanism for said chain arranged to give the chain a step by step advancing movement, means for delivering packages one at a time with a wrapper partially folded about each package into the pockets of the chain, devices arranged to fold the wrappers about the packages while they are in said pockets, means for advancing a label over the path in which said packages are moved by said chain and a presser device operative to press each label so advanced into contact with one of said packages.

7. In a wrapping machine, a vertical stacker comprising oppositely arranged brushes between which the packages are forced, said brushes having upwardly inclined bristles serving to support the packages in the stacker by their pressure on opposite faces of the package, and means for forcing the packages upwardly one at a time into the stacker.

8. In a wrapping machine, a stacker and means for forcing packages into said stacker one at a time, said stacker being so positioned that the packages tend to fall therethrough under the influence of gravity and comprising brushes arranged to bear on opposite faces of the packages and to support the packages in the stackers, the bristles of said brushes being inclined in the direction in which the packages are moved into the stacker by said means.

9. In a wrapping machine the combination with folding mechanism operative to fold a wrapper about an article having inset faces at its opposite ends and to fold the end flaps of the wrapper against the opposite ends of the article, of a plurality of sets of presser devices mounted for engagement with the folds at the opposite ends of the article to press said overlapping folds into an inset position against said end faces of the article, and package-advancing means operative to present each package successively to said sets of presser devices.

10. In a wrapping machine the combination with folding mechanism operative to fold the wrapper about an article having inset end faces and to fold the end flaps of the wrapper against the opposite ends of the article, of a pair of presser devices mounted for movement toward and from each other to press said end flaps against said inset end faces, package-advancing means constructed and arranged to present the packages one at a time for the operation thereon of said presser devices, and additional means for pressing said end folds against said inset end faces and arranged to operate on the packages subsequently to the operation thereon of said presser devices.

In testimony whereof I have signed my name to this specification.

HARRY Y. ARMSTRONG.